United States Patent [19]

Epperson

[11] Patent Number: 5,259,140
[45] Date of Patent: Nov. 9, 1993

[54] TELESCOPING FISHING ROD ASSEMBLY

[76] Inventor: Frank E. Epperson, 11397 E. Arkansas Ave., Aurora, Colo. 80012

[21] Appl. No.: 908,945

[22] Filed: Jul. 6, 1992

Related U.S. Application Data

[63] Continuation of Ser. No. 647,132, Jan. 29, 1991, abandoned.

[51] Int. Cl.$^5$ .............................................. A01K 87/00
[52] U.S. Cl. ........................................ 43/18.1; 43/23; 43/26
[58] Field of Search .................. 43/23, 24, 26, 18.1

[56] References Cited

U.S. PATENT DOCUMENTS

| | | | |
|---|---|---|---|
| 828,557 | 8/1906 | Levison | 43/23 |
| 1,587,446 | 6/1926 | Viers | 43/23 |
| 2,597,738 | 5/1952 | Koos | 43/23 |
| 2,874,507 | 2/1959 | Faber et al. | 43/18.1 |
| 3,927,486 | 12/1975 | Yuen | 43/23 |
| 3,975,855 | 8/1976 | McKeown | 43/23 |
| 4,261,129 | 4/1981 | Ohmura | 43/25 |

Primary Examiner—Mark Rosenbaum
Assistant Examiner—James Miner
Attorney, Agent, or Firm—John E. Reilly

[57] ABSTRACT

A telescoping fishing rod assembly includes an elongated tubular handle for compact storage of the telescoping rod sections with the line guides on the sections protruding from one end, and a removable cap member is placed over the line guides to protect against damage. The rod sections are removably connectable to either end of the handle so that the assembly can be interchangeably used as a fly rod or spin-casting rod.

9 Claims, 1 Drawing Sheet

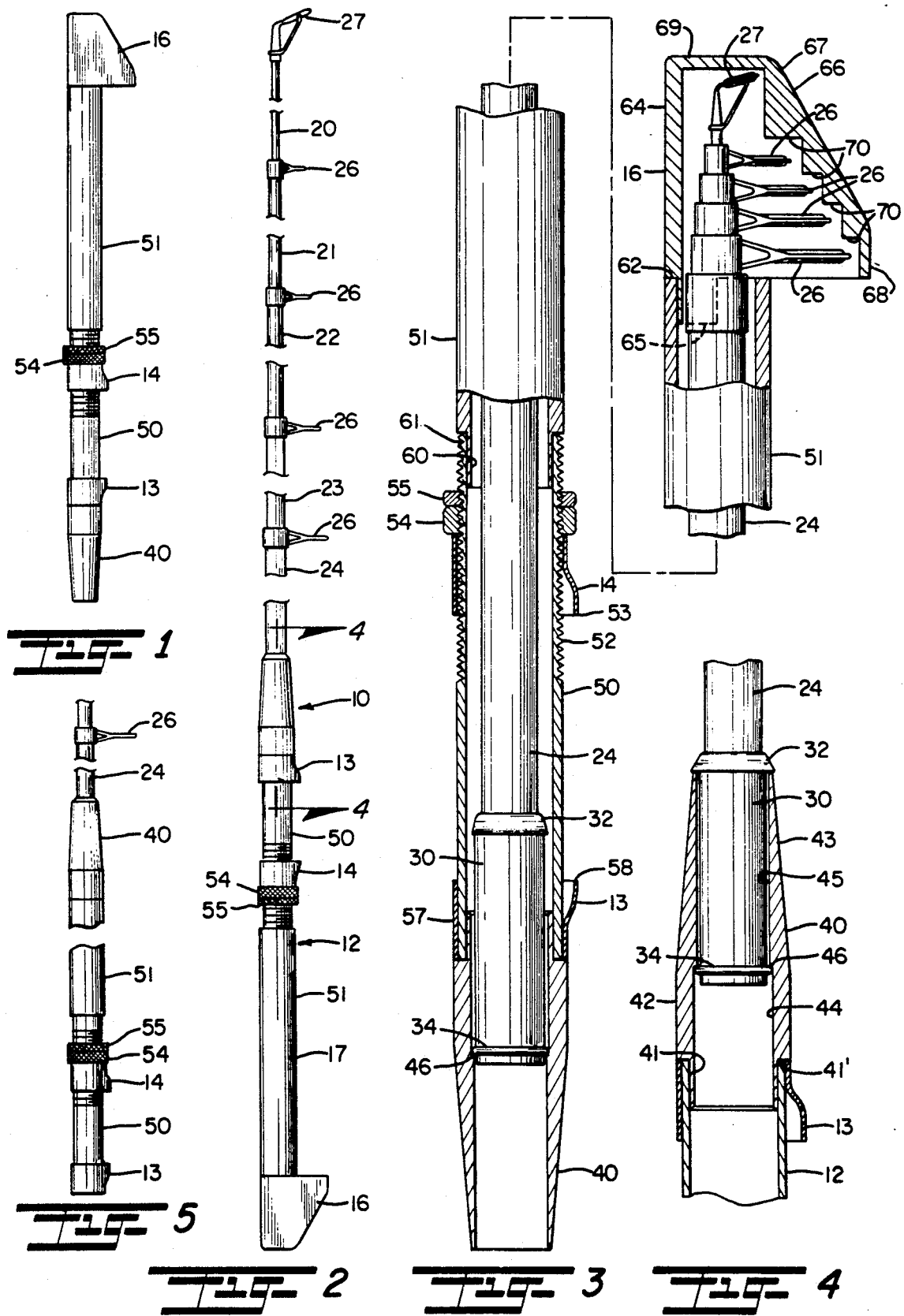

TELESCOPING FISHING ROD ASSEMBLY

This application is a continuation application of Ser. No. 647,132, filed Jan. 29, 1991, now abandoned, for TELESCOPING FISHING ROD ASSEMBLY, invented by Frank E. Epperson.

This invention relates to fishing rods; and more particularly relates to a novel and improved telescoping fishing rod assembly which is interchangeable for use as a spin-casting rod or fly rod.

BACKGROUND AND FIELD OF THE INVENTION

Telescoping fishing rods have been devised in the past in which the rod sections are at least capable of being partially telescoped into a hollow handle portion. Customarily, the practice has been to form a fixed connection between the butt end of the first or largest rod section and the handle and then to telescope or collapse the rod sections through the front end of the handle. For the most part, this practice has been followed for rod sections in which the line passes internally through the rod sections, as opposed to being threaded through line guides on the exterior of the rod sections and, for example, reference is made to U.S. Pat. Nos. 3,447,254 to N. Sobel et al, 3,618,253 to M. R. Edwards et al, 3,789,533 to A. L. Bowerfind et al, 3,862,509 to J. Petersen, Jr., 4,237,639 to Y. Uemori et al, 4,541,197 to L. J. LeRoue and 2,541,609 to J. F. Pullan. It is extremely important, however, in rod sections having external line guides that both the rod sections and line guides be fully protected in the collapsed or stored position and to the extent that they are fully enclosed or encased within a rugged outer housing or casing but at the same time can be collapsed into the most compact position possible. Of the telescoping fishing rods that have been devised having line guides, to the best of my knowledge, no one has devised an arrangement whereby the rod sections can be fully collapsed into a tubular handle and the line guides fully protected when in the stored position. U.S. Pat. No. 2,597,738 to J. W. Koos discloses a telescoping fishing rod assembly in which the rod joints are telescoped through the front end of the rod but requires a clamp on the handle which engages the line guides when the rod sections. U.S. Pat. No. 564,742 to F. K. Dunn discloses telescoping rod sections with line guides which can be partially telescoped into a handle, and the same is true of U.S. Pat. Nos. 1,064,030 to C. A. Tredwell and 1,586,446 to A. Viers.

It is also desirable to construct the fishing rod assembly in such a way that it is interchangeable for use either as a fly rod or spin-casting rod. Specifically, to achieve this end, it is important that the hand grip can be reversibly mounted with respect to the rod sections so that the reel support is at the rearward end of the hand grip when the rod is to be used as a fly rod and more at the forward end of the hand grip when the rod is to be used as a casting rod. It has been found that this can be achieved in a novel and improved manner in a telescoping fishing rod assembly so as to achieve maximum versatility but at the same time fully cover and protect the rod assembly when not in use.

SUMMARY OF THE INVENTION

It is therefore an object of the present invention to provide for a novel and improved fishing rod assembly which can be fully collapsed into a compact condition and of a size that can be easily carried on one's person, such as, in a pocket or knapsack or can be conveniently stored in an out-of-the-way area so as to avoid accidental damage to the rod or rod sections.

It is another object of the present invention to provide for a telescoping fishing rod assembly which can be fully collapsed and stored within the handle of the assembly, can be simply and inexpensively manufactured out of a minimum number of parts and is easy to assemble and use.

It is a further object of the present invention to provide for a telescoping fishing rod assembly in which the telescoping rod sections can be fully collapsed and stored within the handle of the rod with only the line guides or ends of the rod sections protruding into a removable cover at one end of the handle; and further wherein the assembly can be interchangeably used as a fly rod or spin-casting rod without addition or modification of any of the parts comprising the assembly.

In accordance with the present invention, a preferred form of telescoping fishing rod assembly is of the type comprising a plurality of rod sections connectable in end-to-end relation to one another and which are retractable or collapsible into an effective length corresponding to one of the rod sections, in further combination with an elongated tubular handle having an inner diameter sized for insertion of said retracted rod sections through one open end of the handle into a collapsed position, and releasable connecting means at an opposite end of the handle for releasably connecting one end of said one of the rod sections to the handle when the rod sections are extended outwardly into end-to-end relation to one another. Preferably, the rod sections are of a type having line guides adjacent to their leading ends and which guides are movable into close proximity to one another when the rod sections are retracted and inserted into the handle for storage, and a cap member includes means removably positioning the cap member on the one end of the handle with the line guides enclosed within the cap member when the rod sections are retracted into the handle.

Further, the rod sections are preferably connected in telescoping relation to one another and of progressively reduced diameter outwardly from the one rod section so that they can be fully retracted into the one rod section, then inserted into the opposite end of the handle so that only the line guides protrude away from the handle into the removable cap member.

Another feature of the present invention resides in the cooperative disposition and relationship between the handle and rod sections in such a way that the rod sections are releasably connectable to opposite ends of the handle for use either as a fly rod or casting rod.

The above and other objects, advantages and features of the present invention will become more readily appreciated and understood when taken together with the following detailed description of a preferred embodiment of the present invention in conjunction with the accompanying drawings, in which:

BRIEF DESCRIPTION OF THE DRAWINGS

FIG. 1 is a side view in elevation of a preferred form of fishing rod assembly shown in the collapsed position;

FIG. 2 is a side view in elevation of the preferred form of fishing rod assembly with the rod sections shown in the extended position for use in accordance with the present invention;

FIG. 3 is another side view partially in section and enlarged of the preferred form of fishing rod assembly in the collapsed position as also shown in FIG. 1;

FIG. 4 is an enlarged fragmentary view partially in section of the handle portion of the preferred form of fishing rod assembly with the rod sections connected for use as a spin-casting rod; and FIG. 5 is a side view in elevation of the preferred form of invention with the rod sections connected for use as a fly rod.

DETAILED DESCRIPTION OF PREFERRED EMBODIMENT

Referring in more detail to the drawings, there is illustrated in FIGS. 1 to 4 a preferred form of fishing rod assembly as generally designated at 10 which is broadly comprised of an elongated tubular handle 12 provided with suitable reel support portions 13 and 14 toward one end of the handle, a removable cap 16 at the opposite end, and a hand grip 17 extends directly behind the reel support members 13 and 14. A plurality of rod sections may suitably consist of a tip section 20, intermediate sections 21, 22 and 23 and a larger or butt end section 24. Each of the rod sections has a line guide 26 at its leading end and a tip guide or eye 27 at the leading end of the tip 20. Each rod section as shown is of generally tubular configuration and tapered forwardly from its butt or trailing end to its leading end and are so dimensioned that adjacent sections may be closely interfitted one within the other so that when extended as shown in FIG. 2 the leading end of a larger section will frictionally engage the trailing end of a next larger section in accordance with conventional practice. Moreover, the rod sections 20-24 are of substantially corresponding length so that when retracted or telescoped inwardly from the extended position shown in FIG. 2 to the retracted position shown in FIG. 3 will be substantially fully collapsed within the larger butt end section 24 and with the line guides nested or stacked together as shown in FIG. 4. It should also be noted that the larger section 24 includes an enlarged butt end portion 30 having a beveled collar 32 and an outer flexible or pliant circumferentially extending rib 34 which protrudes slightly from the external surface of the end portion 30. As opposed to the greater length of the rod section 24, the end portion 30 is preferably of uniform outer diameter, except for the collar 32 at the front end and the rib portion 34 at the rearward end.

The end 30 of the rod section 24 is releasably connected to the handle 12 by a hollow tubular extension or end fitting 40 at one end of the handle 12, the extension 40 including a reduced end 41 for close-fitting insertion into one end of the handle 12 and a tubular body 42 having an external wall 43 tapering forwardly and uniformly along the greater length of the extension 40. The body 42 also has an inner wall surface 44 of slightly larger diameter than wall surface 45 along the tapered section of the body with a shoulder 46 therebetween, and the inner wall surface 45 is dimensioned for close-fitting insertion of the butt end 30 until the rib 34 clears the shoulder 46 and the collar 32 engages the front end of the fitting 40. In this relation, the butt end 30 must be forcefully inserted through the end fitting 40 until the rib 34 clears the shoulder 46 so as to wedge the rod sections 20 to 24 firmly in position with respect to the handle 12. Furthermore, the reduced end 41 must be forcefully inserted into the handle 12 until the shoulder 41' abuts the leading edge of the handle 12 and reel support 13.

The handle 12 is preferably made up of first and second tubular sections 50 and 51 interconnected in end-to-end relation to one another, the section 50 serving as the reel support section and the section 51 serving as the hand grip section. As best seen from FIG. 3, the tubular portion 50 is of uniform internal diameter throughout but is externally threaded at 52 for adjustable connection of the reel support member 14. The reel support member 14 is of conventional construction and is of annular configuration with a slight enlargement as at 53 to form a space for insertion of one end of the support leg of a reel, not shown. Suitable lock nuts 54 and 55 are provided to axially adjust the reel support 14 with respect to the reel support 13. Similarly, the reel support 13 is of conventional construction including an annular member 57 having a slight enlargement 58 to define a space for insertion of the opposite end of the support leg of the fishing reel. The hand grip 51 is of uniform inner and outer diameter with the exception of a reduced end 60 for snug-fitting insertion into an end of the reel support section 50 until an external shoulder 61 moves into abutting relation to the threaded end 52 of the section 50. Preferably, the hand grip section 51 is of the same external diameter as the section 50 but of a slightly reduced inner diameter and terminates in a rearward end 62.

In order to store the rod sections in the handle, the butt end 30 must be forcefully removed from the extension 40 and inserted through the rear end 62 and passed through the tubular sections 51 and 50 until the rib 34 once again moves into abutment with the internal shoulder 46 of the extension 40 and with the line guides nested together and protruding from the rear end 62.

The preferred form of cap member 16 includes a generally cylindrical wall portion 64 including a reduced end 65 for close-fitting insertion into the rearward end 62 of the hand grip portion 51, and a hollow offset wall portion 66 defines a lateral continuation of the cylindrical portion 64. The wall portion 66 has an outer inclined surface 67 which tapers rearwardly from outer end 68 and terminates in a squared end wall 69. The internal surface of the inclined portion 67 is provided with a plurality of shoulders 70 which are stepped in a progressively inward direction toward the rear end wall 69 so as to serve as stop members discouraging any undue sliding movement of the line guides 26 within the cap 16. Thus, in the stored position, the rod sections are retained snugly between the shoulder 46 and the cap member 16 and the line guides 26 and 27 are fully protected by the cover against bending or breaking when not in use.

In the relationship shown in FIGS. 1 and 2, the handle and rod sections are illustrated in the traditional spin-cast position with the reel support section 50 forwardly of the hand grip section 51. As shown in FIG. 5, the rod assembly may be converted into a fly rod simply by removing the extension 40 from the leading end of the reel support section and inserting into the end of the hand grip 51 in place of the cap member 16 so that the rod sections then extend forwardly from the hand grip section rather than the reel support section 50, and the reel support section 50 is then at the rearward end of the handle. In order to store the rod sections after use as a fly rod, the extension 40 should be returned to its original disposition in front of the reel support in order that the cap 16 will fit snugly into the hand grip section 51, or a suitable adaptor could be provided to assure snug-fitting engagement with the cap member and reel support section 50 so that the rod sections can be stored without reversing the mounting of the extension 40.

It is therefore to be understood that the foregoing and other modifications and changes may be made in the construction and arrangement of parts comprising the preferred form of the present invention without departing from the spirit and scope thereof as defined by the appended claims and reasonable equivalents thereof.

I claim:

1. In a fishing rod assembly wherein a plurality of rod sections are connectable in telescoping relation to one another for movement between an extended position for casting in which said rod sections are disposed in end-to-end relation to one another and a retracted position for storage in which said rod sections have an effective length corresponding to one of said rod sections, the combination therewith comprising:

an elongated tubular handle having an inner diameter sized for insertion of said rod sections into the retracted position within said handle, said one of said rod sections having a length corresponding substantially to the length of said handle, and releasable connecting means releasably interconnecting one end of said one of said rod sections to one end of said handle for axial extension of said rod sections in end-to-end relation from said one end of said handle in one direction when said rod sections are in the extended position whereby said handle defines an axial extension of said rod sections and for extension of said rod sections in an opposite direction through said handle when said rod sections are in the retracted position for storage in said handle.

2. In a fishing rod assembly according to claim 1, each of said rod sections including a line guide adjacent to one end thereof, said line guides movable into close proximity to one another when said rod sections are retracted and inserted into said handle, and a cap member including means removably positioning said cap member on said one end of said handle with said line guides enclosed in said cap member when said rod sections are retracted into said handle and said releasable connecting means is connected to an opposite end of said handle.

3. In a fishing rod assembly according to claim 2, said releasable connecting means being removably inserted into said opposite end of said handle and being of generally tubular configuration having a collar at one end and a circumferentially extending rib at an opposite end thereof.

4. In a fishing rod assembly according to claim 2, said cap member being of hollow, generally cylindrical configuration and having inwardly stepped portions along one wall surface thereof.

5. In a telescoping fishing rod assembly wherein a plurality of telescoping rod sections are connectable in end-to-end relation to one another and are retractable into an effective length corresponding to one of said rod sections, each of said rod sections including a line guide adjacent to one end thereof, said line guides movable into close proximity to one another when said rod sections are retracted, the combination therewith comprising:

an elongated tubular handle of a length substantially corresponding to the length of said one of said rod sections, said handle including a reel support portion and a hand grip portion, said handle having an inner diameter sized for insertion of said rod sections through one open end of said handle into a retracted position within said handle, and releasable connecting means connected to one end of said one of said rod sections for releasably connecting said rod sections to an opposite end of said handle for axial extension away from said handle in one direction when said rod sections are in the extended position, and said releasable connecting means being reversibly connected with respect to said opposite end of said handle for extension of said rod sections in an opposite direction through said handle in the retracted position; and a cap member including means removably positioning said cap member on said one open end of said handle with said line guides enclosed in said cap member when said rod sections are retracted into said handle.

6. In an assembly according to claim 5, said releasable connecting means being removably connected to said opposite end of said handle.

7. In an assembly according to claim 5, said cap member including means removably connecting said cap member to said one end of said handle with said line guides enclosed within said cap member.

8. In an assembly according to claim 5, said releasable connecting means being of tubular configuration and defining an axial extension of said handle, and one end of said one of said rod sections releasably inserted into said releasable connecting means, said releasable connecting means being reversibly insertable into said opposite end of said handle.

9. A telescoping fishing rod assembly comprising in combination:

a plurality of telescoping rod sections connectable in end-to-end relation to one another and retractable into a collapsed position of an effective length corresponding to one of said rod sections;

an elongated tubular handle member having an inner diameter sized for insertion of said retracted rod sections therein;

a cap member at one end of said handle for insertion of said line guides; and releasable connecting means at one end of said rod sections for releasably connecting said rod sections to said handle, said releasable connecting means being of tubular configuration and including complementary shoulder portions on said releasable connecting means and interior of said handle whereby said releasable connecting means are reversibly connected to said one end of said rod sections for extension of said rod sections in one direction in end-to-end relation to sand handle with said handle extending axially beyond said rod sections and for extension of said rod sections in an opposite direction through said handle into the collapsed position substantially within said handle.

* * * * *